United States Patent [19]

Hall

[11] Patent Number: 4,830,748

[45] Date of Patent: May 16, 1989

[54] APPARATUS FOR CLEANING ALGAE AND DEBRIS FROM A WATER TREATMENT TANK

[76] Inventor: Ford W. Hall, 491 Carr Ct., Lexington, Ky. 40505

[21] Appl. No.: 188,972

[22] Filed: May 2, 1988

[51] Int. Cl.⁴ .............................................. B01D 21/06
[52] U.S. Cl. .................................. 210/241; 15/246.5; 210/528; 210/541
[58] Field of Search ............... 210/523, 525, 528, 530, 210/241, 541; 15/246.5

[56] References Cited

U.S. PATENT DOCUMENTS

| | | | |
|---|---|---|---|
| 1,975,109 | 10/1934 | Laughlin et al. | 210/528 |
| 2,611,489 | 9/1952 | Scott | 210/528 |
| 2,742,422 | 4/1956 | Saddington et al. | 210/52 |
| 3,327,336 | 6/1967 | Mueller | 15/17 |
| 3,611,465 | 10/1971 | Rasmussen | 15/56 |
| 4,266,601 | 5/1981 | Jenkins | 165/94 |
| 4,462,909 | 7/1984 | Kennel | 210/525 |

FOREIGN PATENT DOCUMENTS 57-41282  9/1982  Japan .

Primary Examiner—Richard V. Fisher
Assistant Examiner—Christopher Upton
Attorney, Agent, or Firm—King & Schickli

[57] ABSTRACT

An apparatus is provided for cleaning algae and other debris from the baffle, weir, spillway and clean water flow channel of a water treatment tank. The apparatus includes a main frame member that is mounted to a revolving skimmer blade assembly of the tank. A series of cleaners, such as brushes, are mounted to the frame member and biased into engagement with the baffle, weir, spillway and walls of the clean water flow channel. In the preferred embodiment, three sets of brushes are provided. A first set of brushes cleans the baffle and weir. A second set of brushes also cleans the weir and additionally the spillway. A third set of brushes includes opposing brushes for cleaning the sidewalls of the clean water flow channel and a brush at a distal end of a support arm for cleaning a bottom wall of the channel. A bridging device is positioned in the clean water outlet of the flow channel so as to support the third set of brushes as it passes over the outlet.

16 Claims, 2 Drawing Sheets

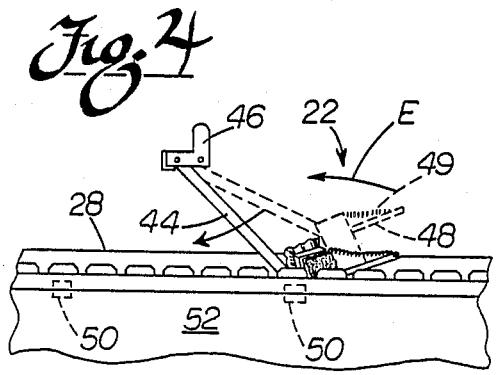
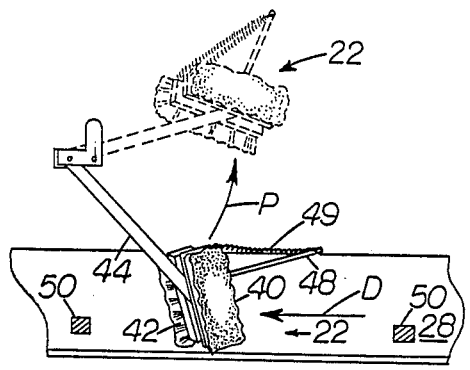
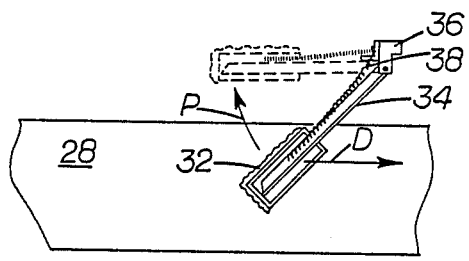
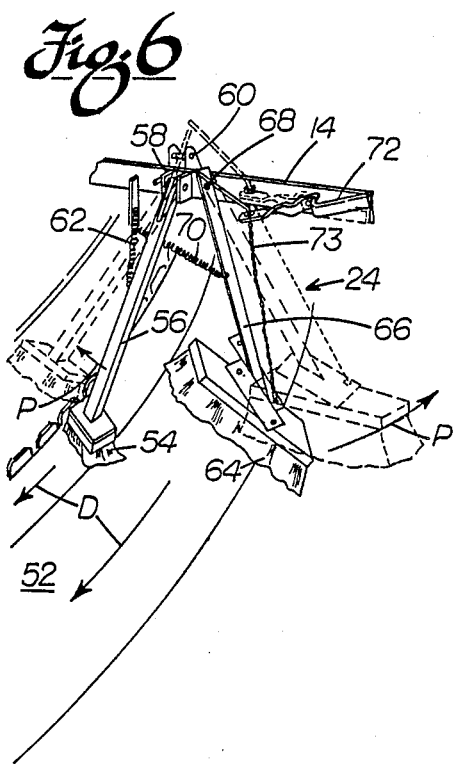
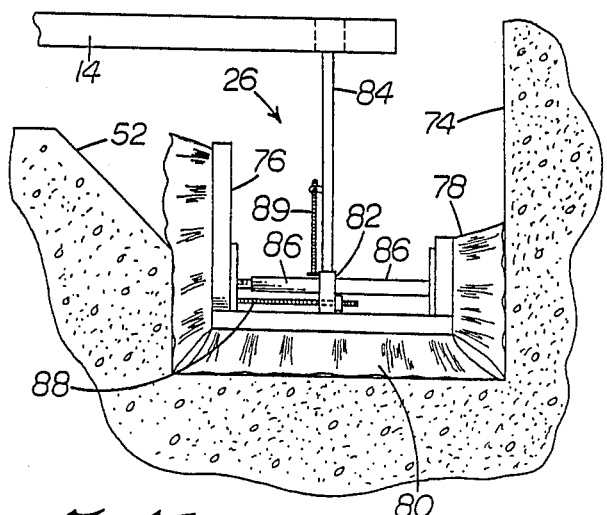

APPARATUS FOR CLEANING ALGAE AND DEBRIS FROM A WATER TREATMENT TANK

TECHNICAL FIELD

The present invention relates generally to cleaning of sewage treatment facilities and more particularly, to an apparatus for automatically removing algae and debris from the surfaces of a final sedimentation water treatment tank.

BACKGROUND OF THE INVENTION

The necessity for providing sewage treatment plants to clean and purify water discharged from homes and factories is well known. The function of a sewage treatment facility is to receive raw sewage (water containing waste material) as discharged from a city sewerage system and clean it to ultimately produce purified water. This is accomplished through a series of biological and mechanical processes.

In a typical water treatment facility, the raw sewage is received from the sewerage system and passed through a coarse screen to remove large pieces of matter. The sewage is next directed to one or more primary sedimentation tanks or clarifiers. The sewage remains in primary sedimentation for a period of time sufficient to allow the majority of the heavy matter to settle to the bottom of the tank forming sludge. The sludge is removed for "digestion" by micro-organisms. The digested sludge is dried and can be used as compost or fertilizer. The remaining liquid is treated in a second biological system to remove ammonia. The liquid from this treatment is then aerated and passed into final sedimentation water treatment tanks to remove any remaining solid material.

Water treatment tank configurations vary with each treatment facility application. This notwithstanding, most final sedimentation water treatment tanks are round. This simplifies automatic skimming, churning and/or bottom scraping operations. More specifically, by eliminating inaccessible corners and providing uniform surfaces a revolving arm or skimmer blade can provide complete and efficient churning and prevent sludge buildup.

During operation of one type of water treatment tank sediment containing water enters the center of the tank. In a continuous process, the lighter clean water is effectively decanted from the heavier sediment containing water. More particularly, the clean water is displaced from the tank by the constant flow of sediment containing water into the tank. The displaced clean water is forced to flow under a baffle plate for collecting floating scum and then over a weir, ultimately entering a clean water flow channel. The clean water flow channel directs the water to the next treatment stage where it is chlorinated and further made safe to be discharged into a river or stream.

As is known in the art, the outdoor exposure of the water treatment tanks in direct sunlight encourages the growth of algae. This growth is most prevalent on the baffle, weir, spillway and clean water flow channel. Disadvantageously, algae growth on these members inhibits the flow of clean water from the tank. Further, the algae can be carried in thick masses and high concentrations in the clean water being discharged from the final treatment tank. When this occurs, large concentrations of chlorine are required to kill the algae. Because chlorine is relatively expensive, it is desirable to avoid this problem.

To date, removing the algae from the baffle, weir, spillway and clean water flow channel has been done primarily by scrubbing the tank structure with brushes manipulated by hand. Because the final treatment tanks are quite large, this naturally, is a labor intensive and tedious process, involving a large expenditure of man-hours and cost outlay. Additionally, the algae removing process must be done frequently, further adding to the cost.

This can be dramatically demonstrated by considering the following example. It takes approximately eight man hours to manually clean the algae from the baffle, weir, spillway and clean water flow channel of a water treatment tank having a diameter of approximately 60 feet. At a labor wage rate of eight dollars per hour, it costs approximately sixty four dollars to clean one tank. Preferably, such a cleaning is performed once a week on average (perhaps more often in summer and less often in winter, depending on weather conditions). This represents a cost of $3,328 per year to clean just one treatment tank. Of course, most facilities include more than one tank. For example, a four tank facility may spend as much as $13,312 in labor alone to clean the algae from its tanks each year. Any substantial reduction in this expense is desirable.

A need therefore exists for an algae removal or cleaning apparatus for use in sewage treatment facilities. Such an apparatus should be reliable and effective in eliminating the buildup of algae while substantially reducing clean up costs.

SUMMARY OF THE INVENTION

It is therefore an object of the present invention to provide an apparatus for effectively cleaning algae and other debris from the baffle, weir, spillway and clean water flow channel of a water treatment tank.

Another object of the present invention is to provide an apparatus for cleaning algae and debris from a water treatment tank that is relatively inexpensive to construct, simple to install and economical to operate.

A further object of the present invention is to provide an algae cleaning apparatus that may be quickly and conveniently moved from one water treatment tank to another so as to clean each tank at a sewage treatment facility in a relatively short time.

Still another object of the present invention is to provide an apparatus for cleaning algae and debris from a water treatment tank which requires no additional energy input to perform its function.

Yet another object of the present invention is to provide an apparatus for cleaning algae and debris from a water treatment tank which, once installed, is fully automatic in operation.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an apparatus is provided for cleaning algae and other debris from the surfaces of a final sedimentation water treatment tank.

The preferred embodiment of the cleaning apparatus selected to illustrate the invention includes three sets of cleaning brushes pivotally attached through support arms to a main frame member. The main frame member is attached to the skimmer blade which is an operating part of the water treatment tank. As known in the art, the skimmer blade revolves slowly around the circular treatment tank directing any material or scum floating on the surface of the water into a drain. Advantageously, as the skimmer blade revolves, the cleaning apparatus attached to the end of this skimmer blade is driven around the tank to provide complete cleaning.

As indicated above, the cleaning brushes are pivotally attached to the main frame member by support arms. Each support arm acts independently of the others. This allows the brushes to conform to surface irregularities independently. Additionally, each support arm is mounted such that it can be pivoted up and locked in a position out of operative engagement. In this manner, the brushes can be independently placed into or out of engagement as desired. This allows only a portion of the water treatment tank to be cleaned if necessary. Additionally, this allows replacement of the brushes while the apparatus is in use thereby negating the necessity of removing the entire apparatus from the skimmer blade.

The first set of cleaning brushes includes three brushes to clean the inside and outside surfaces of the baffle and the inside surface of the weir. The brush for cleaning the inside surface of the baffle is mounted on its own support arm. A coil spring is provided between the support arm and main frame member to urge the cleaning brush into positive engagement with the inside surface of the baffle wall. Advantageously, this assures good cleaning and scrubbing action for best removal of the sticky algae.

The brushes for cleaning the outside surface of the baffle and the inside surface of the weir are oppositely mounted on a second support arm. These brushes are pivotally mounted on the base of the second support arm and are urged by a spring into substantially vertical alignment when placed in the operative cleaning position. This is a particularly important feature of the present invention.

As is known in the art, the baffle is attached to the weir wall by a plurality of brackets. These brackets are near the surface and are in the preferred path to be followed by the cleaning brushes. Advantageously, the pivotal mounting action of these brushes allows the brushes to "step over" the brackets while in operation. This allows the most effective cleaning possible while also providing uninterrupted automatic operation.

The second set of brushes are provided to clean the outside surface of the weir and the spillway. Two brushes are provided, each separately mounted to a third and fourth support arm. Both support arms are biased into positive contact by coil springs. Here again, each brush can be lifted out of engagement with the surface and locked in a disengaged position independently.

The third set of brushes is provided to clean the opposing walls and the bottom of the clean water flow channel. In this set, three brushes are provided, all attached to a single positioning arm. Two of the brushes are oppositely mounted to clean the opposite walls of the clean water flow channel. One brush is mounted orthogonally to the other two brushes and is provided to clean the bottom of the channel. The opposed brushes are biased into positive engagement with the channel walls by a set of telescoping spring loaded tubes. The weight of the brush set serves to maintain the other brush in scrubbing contact with the bottom wall.

A stabilizing rod is provided to resist the tendency of the brushes to twist during operation. Thus, the brushes are always maintained in the proper orientation for best cleaning action. In addition, a bridging device is provided in the outlet of the clear water flow channel to support this set of brushes as it passes over the outlet.

Advantageously, use of the apparatus of the present invention results in a significant cost savings to the operator. This is because the apparatus is quickly and easily installed and cleans automatically, thereby freeing plant personnel from the drudgery and time consuming task of cleaning the tanks by hand.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principals of the invention. In the drawing:

FIG. 4 is a schematical view of the first set of brushes for cleaning the outside of the baffle and the inside of the weir, the phantom view and the action arrows depicting operation as the brushes travel over a baffle support bracket;

FIG. 4A shows the brushes of FIG. 4 in the engaged and disengaged positions;

FIG. 5 shows the other brush in the first set of brushes for cleaning the inside surface of the baffle in both the engaged and disengaged positions;

FIG. 6 shows the second set of brushes in the engaged and disengaged positions;

FIG. 7 shows the clean water flow channel in cross section and the third set of cleaning brushes in the engaged position.

Reference will now be made in detail to the present preferred embodiment of the invention, an example of which is illustrated in the accompanying drawing.

DETAILED DESCRIPTION OF THE INVENTION

Figure 1:
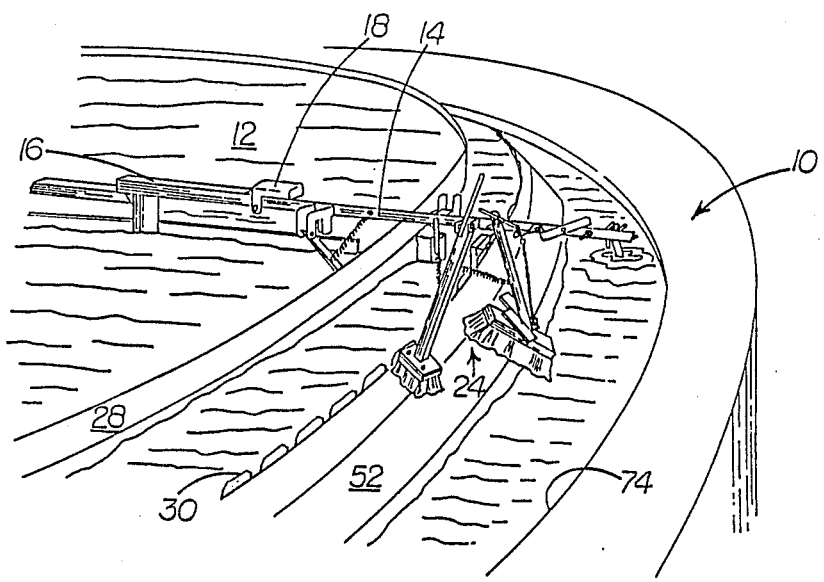
FIG. 1 is a perspective view of the cleaning apparatus of the present invention shown installed on a water treatment tank.
Figure 2:
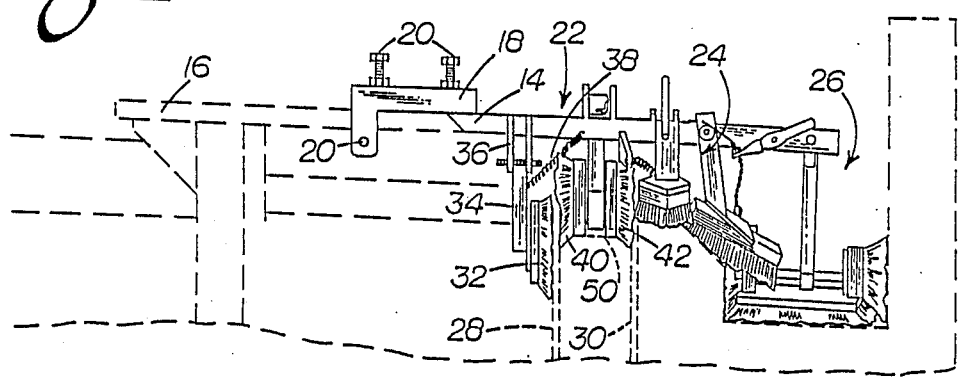
FIG. 2 is a schematical view of the water treatment tank showing the cleaning apparatus of the present invention in an operative cleaning position, the details of the water treatment tank being shown in phantom.

Reference is now made to FIG. 1 showing the apparatus 10 of the present invention installed in a final sedimentation water treatment tank 12. As is shown in FIGS. 1 and 2, the apparatus 10 includes a main frame member 14 which is installed on the end of skimmer blade 16. During operation, the skimmer blade 16 is slowly revolved around the circular water treatment tank 12 to direct any floating debris to a drain. The apparatus 10 through main frame member 14 is simply driven around the tank by skimmer blade 16. In this manner, the cleaning operation can be accomplished automatically, without any external energy input.

As is best illustrated in FIG. 2, main frame member 14 includes a mounting bracket 18. To install the apparatus 10, mounting bracket 18 is simply placed over the end of skimmer blade 16 and tightened securely into position through the use of set bolts 20. Advantageously, it should be appreciated that the convenient mounting of the cleaning apparatus 10 through the bracket 18 allows the apparatus to be easily disconnected from one skimmer blade 16 and then reconnected to another skimmer blade in another water treatment tank. It takes only approximately 10 minutes to complete this operation. Thus, one cleaning apparatus 10 of the present invention can be readily utilized to clean a number of treatment tanks at the same sewage treatment facility.

The preferred embodiment of the apparatus 10 selected to illustrate the principles of the present invention includes three sets of cleaning brushes 22, 24 and 26 (see FIG. 2). A first set of brushes 22 is provided to clean the baffle 28 and the weir 30. Brush set 22 includes brush 32 for cleaning the inner surface of baffle 28. Brush 32 is pivotally mounted to main frame member 14 through support arm 34 and bracket 36 (see FIG. 5). Spring 38 is provided to apply a positive force between main frame member 14 and support arm 34 thereby biasing brush 32 into tight engagement with the inside surface of baffle 28. Action arrow D shows the direction of brush travel during cleaning.

As is shown in phantom in FIG. 5, brush 32 can be pivoted upwardly and locked into a disengaged or non-operative position (shown by action arrow P). As will be described below, each brush or set of brushes can be locked into a disengaged position much in the same manner as brush 32. Advantageously, this allows cleaning of only the areas required, and also allows the brushes to be cleaned or changed while the apparatus 10 is in operation.

As shown in FIGS. 2 and 4A, the first set of brushes 22 further includes brushes 40 and 42 to clean the outside surface of baffle 28 and the inside surface of weir 30 respectively.

As shown, brushes 40, 42 are pivotally mounted to the distal end of a support arm 44. The support arm 44 is pivotally mounted to the frame member 14 in a bracket 46. A base member 48 is also fixed to the support arm 44 adjacent to the distal end. A spring 49 is connected between one end of each brush 40, 42 and the distal or trailing end of the base member 48. The springs 49 serve to bias the brushes 40, 42 into a substantially vertical orientation as best shown in FIG. 4A. As described in detail below, the biasing springs 49, the pivotal mounting of the brushes 40, 42 to the support arm 44 and the pivotal mounting of the support arm in the bracket 46 serve to allow the brushes to "step over" the brackets 50 upon which the baffle 28 is mounted.

More specifically, when between brackets 50, the springs 49 bias the brushes 40, 42 into a vertical orientation and the weight of the brush set 22 holds the brushes down in the water (see FIG. 4A). This serves to provide cleaning along substantially the entire height of the baffle 28. When the brush set 22, moving in the direction of action arrow D, engages a bracket 50, the brushes 40, 42 pivot (see action arrow E), stretching the springs 49, and the support arm 44 rises to the position shown in phantom in FIG. 4. Thus, the brushes 40, 42 step over the bracket 50 while also scrubbing algae therefrom. As the brushes 40, 42 move past the bracket 50, the springs 49 bias the brushes back into a substantially vertical orientation and the weight of the brushes causes the arm 44 to again drop to the full line position. In this position the brushes 40, 42 again serve to clean down along the baffle 28 between the brackets 50 (see also FIG. 4A). Thus, the baffle 28 may be effectively cleaned without stopping each time a mounting bracket 50 is reached.

As also shown in FIG. 4A, the brushes 40, 42 may be positioned out of engagement with the baffle 28 and weir 30. More specifically, the arm 44 and brushes 40, 42 may be pivoted upwardly (see action arrow P) to the phantom line position. There, the arm 44 may be locked in position by a pin or other means not shown to allow the brushes 40, 42, for example to be cleaned or changed.

As illustrated in FIGS. 1, 2 and 6, a second set of brushes 24 is provided to clean the outside surface of the weir 30 and the spillway 52. The second set of brushes 24 includes brush 54 to further clean the weir 30 and an upper substantially horizontal portion of the spillway 52. Brush 54 is pivotally attached to main frame member 14 through support arm 56 and bracket 58. During cleaning, support arm 56 and accordingly brush 54 are positively biased downwardly by spring 62 into scrubbing engagement with the spillway 52 and weir 30 to provide maximum cleaning.

As discussed above and shown in FIG. 6, brush 54 can be locked in the disengaged position by the use of a pin 60 installed in a second set of holes in bracket 58. This is shown by action arrow P and the phantom view.

The second set of brushes 24 also includes brush 64 to clean the sloping portion of spillway 52. Brush 64 is pivotally mounted to main frame member 14 via support arm 66 and pivot pin 68. Spring 70 is provided to securely bias brush 64 against the surface of spillway 52. Handle 72 may be manipulated by the operator to pivot brush 64 out of operative engagement with spillway 54. As shown in FIG. 6, handle 72 works through chain 73 to move brush 64 (see also action arrow P). Handle 72 is then locked into the non-operative position by locking means (not shown). To return brush 64 to the operative position, handle 72 is released, and spring 70 pulls brush 64 back into the operative position.

As is shown in FIGS. 2 and 7, the third set of brushes 26 is provided to clean the sides and bottom of the clean water flow channel 74. Brush set 26 is comprised of three individual brushes 76, 78 and 80. The three brushes 76, 78 and 80 are mounted to a common base member 82. Advantageously, this results in a one piece brush set which can be connected to main frame member 14 by a single support arm 84. A mounting bracket (not shown) is provided to allow pivotal motion between main frame member 14 and the support arm 84.

Brushes 76 and 78 are mounted to base member 82 by one or more spring loaded telescoping tubes 86. Advantageously, the spring loaded telescoping tubes 86 bias brushes 76 and 78 apart from one another into tight scrubbing engagement with the walls of channel 74. A keeper 88 is provided to limit the expansion of the telescoping tubes 86. In the preferred embodiment, keeper 88 is simply a threaded rod attached to brush 76. The rod freely passes through base member 82 and is retained against the spring force by a nut threaded on the opposite side of base member 82. By adjusting keeper 88, the width of brush set 26 can easily be adapted to conform to a wide variety of clean water flow channels as found in different water treatment tanks.

The remaining brush in set 26, brush 80 is attached to base member 82 and firmly forced into engagement with the bottom of channel 74 simply by the combined weight of the brush set. Due to an observed tendency of brush set 26 to twist during operation, stabilizer bar 89 is provided between support arm 84 and base member 82 to counteract any rotative tendencies. This assures full brush contact with the side and bottom walls of the channel and, therefore, maximum cleaning.

Figure 3:
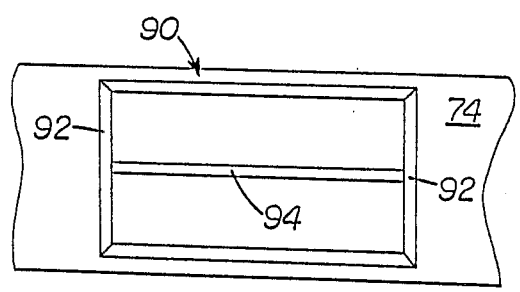
FIG. 3 is a plan view of the bridging device used in the present invention shown installed in the bottom of the clean water flow channel.

As shown in FIG. 3, a water outlet bridge 90 is provided in the bottom of channel 74. The bridge 90 covers the clean water outlet in the channel 74. More specifically, bridge 90 is provided to physically prevent brush set 26 from falling into the clean water outlet during operation. In the preferred embodiment, bridge 90 is fabricated of angle iron 92 with one or more brush supporting cross bars 94. Installation of bridge 90 is quite simple and is accomplished merely by placement over the outlet with the angle irons 92 engaging opposing lips of the outlet. The force of the clean water flow rushing into the outlet keeps the bridge 90 in place. One bridge 90 can be positioned in each tank of a water treatment facility and simply left in position since it does not significantly effect water flow. Conversely, if desired one bridge 90 can be moved from tank to tank with the remainder of the apparatus 10. Because no fasteners are required to hold the bridge 90 in position, such movement can be simply and quickly completed.

In summary, numerous benefits are achieved by the use of the apparatus of the present invention. More specifically, the apparatus 10 is adapted to be quickly and easily installed on an existing skimmer blade 16 of a water treatment tank 12. Once brush sets 22, 24 and/or 26 of apparatus 10 are installed and placed into engaged or operative positions, the apparatus 10 cleans the tank automatically. The apparatus 10 is lightweight and also adapted for quick and convenient movement and set up from tank to tank. Thus, one apparatus can be used to clean a number of tanks at a treatment facility. This results in significant savings in time and labor expended.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the brush sets can be replaced by high pressure water jets to provide the cleaning action. The embodiment was chosen and described to provide the best illustration of the principals of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

I claim:

1. An apparatus for cleaning algae and other debris from a round water treatment tank including a revolving skimmer blade, central influent, a peripheral baffle having inside and outside surfaces, a substantially circular weir and a clean water flow channel, comprising:
   first cleaning means for cleaning said baffle and an inside surface of said weir;
   frame means for supporting said cleaning means; and
   means for mounting said frame means to said revolving skimmer blade whereby said cleaning means is driven around the full length of said baffle and weir so as to provide a complete cleaning.

2. The apparatus set forth in claim 1, further including second cleaning means for cleaning a spillway between said weir and said clean water flow channel.

3. The apparatus set forth in claim 1, further including means for cleaning said clean water flow channel.

4. The apparatus set forth in claim 3, further including means for bridging a clean water outlet in said clean water flow channel so as to provide a surface upon which said clean water flow channel cleaning means is supported as it is driven past the clean water outlet.

5. The apparatus set forth in claim 1, wherein said first cleaning means includes first and second support arms pivotally mounted to said frame means at one end and a base member mounted to said second support arm at an opposite end.

6. The apparatus set forth in claim 5, wherein said first cleaning means further includes a pair of oppositely disposed brushes pivotally mounted to said second support arm, one brush for cleaning said outside surface of said baffle and the other for cleaning said inside surface of said weir; means also being provided for biasing said brushes into a substantially vertical orientation so that when said brushes engage a bracket that supports the baffle in said water treatment tank, said brushes pivot and step over said bracket and are then biased and returned to the substantially vertical orientation for maximum cleaning effectiveness.

7. The apparatus set forth in claim 5, wherein said first cleaning means further includes a brush mounted on said said first support arm for cleaning said inside surface of said baffle.

8. The apparatus set forth in claim 1, wherein said first cleaning means includes means for locking said first cleaning means out of engagement with said baffle and weir.

9. The apparatus set forth in claim 2, wherein said second cleaning means includes a brush mounted to a support arm that is pivotally connected to said frame means and means for biasing said brush for positive pressure engagement with said spillway.

10. The apparatus set forth in claim 9, wherein said second cleaning means also includes means for locking said second cleaning means in a raised position out of engagement with said spillway.

11. The apparatus set forth in claim 3, wherein said clean water flow channel cleaning means includes a support arm pivotally mounted at one end to said frame member and a brush mounted at an opposite end that engages and cleans a bottom wall of said clean water flow channel.

12. The apparatus set forth in claim 11, wherein said clean water flow channel cleaning means further includes two additional brushes that are positioned adjacent ends of said bottom wall cleaning brush and oppositely disposed so as to clean sidewalls of said clean water flow channel.

13. The apparatus set forth in claim 12, wherein said clean water flow channel cleaning means further includes means for biasing said sidewall cleaning brushes apart and into positive engagement with said sidewalls for more effective cleaning action.

14. The apparatus set forth in claim 12, wherein said clean water flow channel cleaning means further includes a stabilizer bar connected between said frame means and said support arm to resist twisting of said clean water flow channel cleaning means in said clean water flow channel as said clean water flow channel cleaning means is driven around said channel.

15. The apparatus set forth in claim 4, wherein said bridging means includes an opening to allow continued outlet of said water as said apparatus is utilized to clean said water treatment tank.

16. The apparatus set forth in claim 15, wherein said bridging means includes an angle iron at each end for engaging opposing lips of said clean water outlet and a spaced cross bar extending between said angle irons for supporting said clean water flow channel cleaning means and preventing entry of said clean water flow channel cleaning means into said outlet as it is driven past said outlet.

* * * * *